United States Patent [19]

Fukushima

[11] Patent Number: 5,570,245
[45] Date of Patent: Oct. 29, 1996

[54] DATA ERASING DEVICE ERASING DESIGNATED DATA

[75] Inventor: Nobuo Fukushima, Yokohama, Japan

[73] Assignee: Canon Kabushiki Kaisha, Tokyo, Japan

[21] Appl. No.: 465,943

[22] Filed: Jun. 6, 1995

Related U.S. Application Data

[63] Continuation of Ser. No. 408,189, Mar. 22, 1995, abandoned, which is a continuation of Ser. No. 165,581, Dec. 13, 1993, abandoned, which is a continuation of Ser. No. 891,916, Jun. 1, 1992, abandoned, which is a continuation of Ser. No. 489,355, Mar. 6, 1990, abandoned.

[30] Foreign Application Priority Data

Mar. 8, 1989 [JP] Japan .................................. 1-55662

[51] Int. Cl.$^6$ .................................. G11B 21/15
[52] U.S. Cl. .................................. 360/66
[58] Field of Search .................................. 360/69, 66

[56] References Cited

U.S. PATENT DOCUMENTS 4,725,902  2/1988  Oda et al. .................................. 360/66

OTHER PUBLICATIONS

*Mastering DOS* by Judd Robbins ©, published by Sybex, pp. 95–102.

*Primary Examiner*—Vincent P. Canney
*Attorney, Agent, or Firm*—Fitzpatrick, Cella, Harper & Scinto

[57] ABSTRACT

A data erasing device erasing designated data includes designating circuitry for designating one of two groups in a storage medium. The two groups comprise a first group including an upper block preceding a designated block, and a second group including a lower block following the designated block. Erasing circuitry is provided for erasing data recorded in blocks which are included in the designated group. Preferably, a designated block is one track in a recording disk, and the tracks above and/or below the designated track are erased.

16 Claims, 6 Drawing Sheets

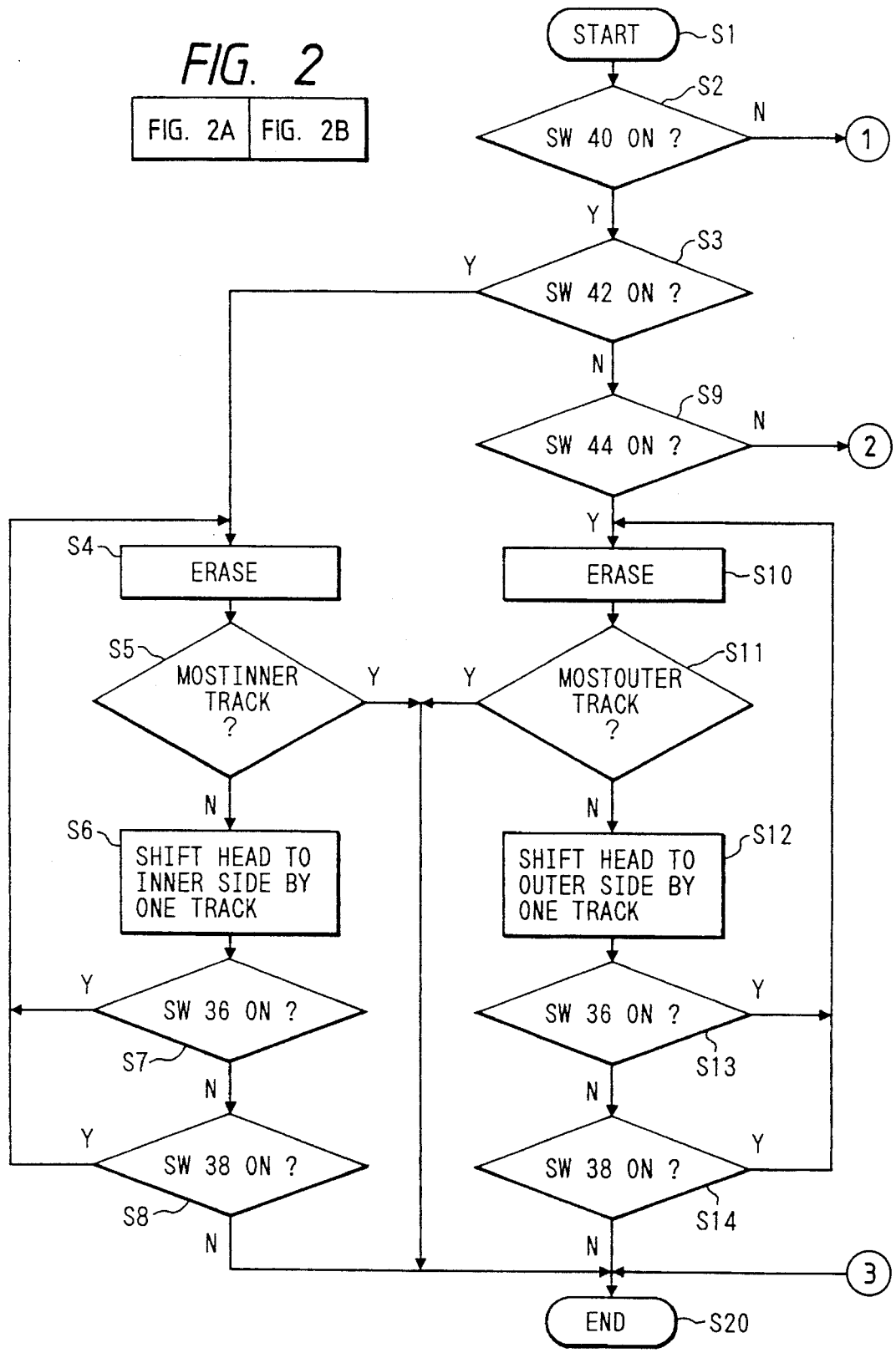

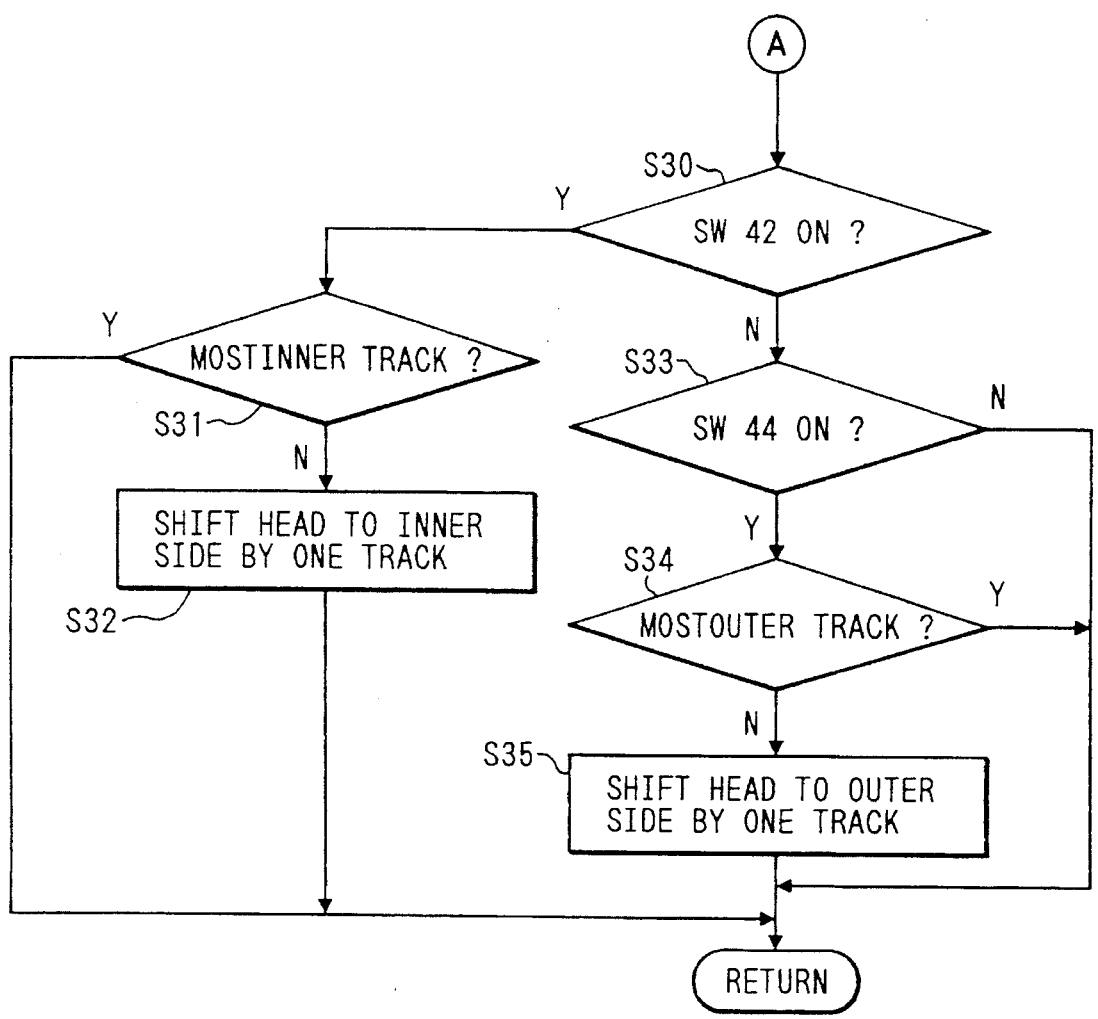

DATA ERASING DEVICE ERASING DESIGNATED DATA

This application is a continuation of application Ser. No. 08/408,189 filed Mar. 22, 1995, which is a continuation of application Ser. No. 08/165,581 filed Dec. 13, 1993, which is a continuation of application Ser. No. 07/891,916 filed Jun. 1. 1992, which is a continuation of application Ser. No. 07/489,355 filed Mar. 6, 1990, all now abandoned.

BACKGROUND OF THE INVENTION

1. Field of the Invention

The present invention relates to a data erasing device used for erasing data recorded on a recording media.

2. Related Background Art

In a still video recording and reproducing device in which a data erasing device is used, a two inch diameter magnetic disk is employed as a magnetic media for recording photographed images. In such a device, two erasing methods of erasing data recorded on tracks of the magnetic disk have been proposed. The first method is known as "the individual erasing method", in which a magnetic head is moved to a designated track to erase data thereon, and the data on the designated track is erased in response to an operation signal, for example, an ON operation signal from an erasing instruction switch. The second method is known as "the lump erasing method", in which data on all tracks from the first track to the last track is erased in response to an operation signal from a specific switch.

In a still video recording and reproducing device, since photographed images are sequentially recorded from the first track positioned at the outermost track of the magnetic disk to the 50-th track as the innermost track thereof, or vice versa, the photographing place and the dates of the images recorded on the outer side tracks of the magnetic disk which are positioned far from a center of the magnetic disk usually differ from those of the images recorded on the inner side tracks which are positioned near the center of the magnetic disk. Accordingly, when unwanted photographed images recorded on the magnetic disk are to be erased, the image continuously recorded on a plurality of the outer side tracks or the inner side tracks of the magnetic disk are erased. The lump erasing method described above can not meet with this requirement. On the contrary, the individual erasing method also has a disadvantageous erasing operation because of a requirement of the individual designation of each track from which the image is to be erased, and requires a long operation time.

The drawbacks described above are, of course, inherent to other devices which handle erasable recording media, in addition to the still video recording and reproducing device described above.

SUMMARY OF THE INVENTION

An object of the present invention is to provide a data erasing device able to erase data recorded on a plurality of blocks of a recording media by a simple operation and in a short time.

Another object of the present invention is to provide a data erasing device able to freely erase data recorded on a plurality of blocks of a recording media.

To achieve the above objects, according to the preferred embodiment of the present invention, there is provided a data erasing device for erasing data recorded on a recording media processed in the form of a plurality of recording regions, each including a unit recording capacity, and including; a first designating means for designating a desired recording region of the recording media, a second designating means for designating one of two sections of the recording media, the two sections being separated by the designation of the first designating means, and an erasing means for erasing data in the recording region of the section of the recording media designated by the first and second designating means.

According to the above construction, data recorded on one section of the two sections, which are separated at the designated position of the recording media, is erased by one operation. This operation, per se, is similar to that of the prior lump erasing method, however, in the present invention, only unwanted data can be erased while maintaining necessary data.

Still another object of the present invention is to provide a data erasing device able to carry out setting operations of a section to be erased and other setting operations.

Yet another object of the present invention is to provide a novel erasing device preferably applicable to an image pickup device.

BRIEF DESCRIPTION OF THE DRAWINGS

Other objects and features of the present invention will be described below in detail with reference to the,accompanying drawings, in which:

FIG. 3 is a flowchart explaining a movement of a magnetic head of the embodiment according to the present invention;

DESCRIPTION OF THE PREFERRED EMBODIMENTS

Preferred embodiments of the present invention will be described with reference to the drawings.

Figure 1:
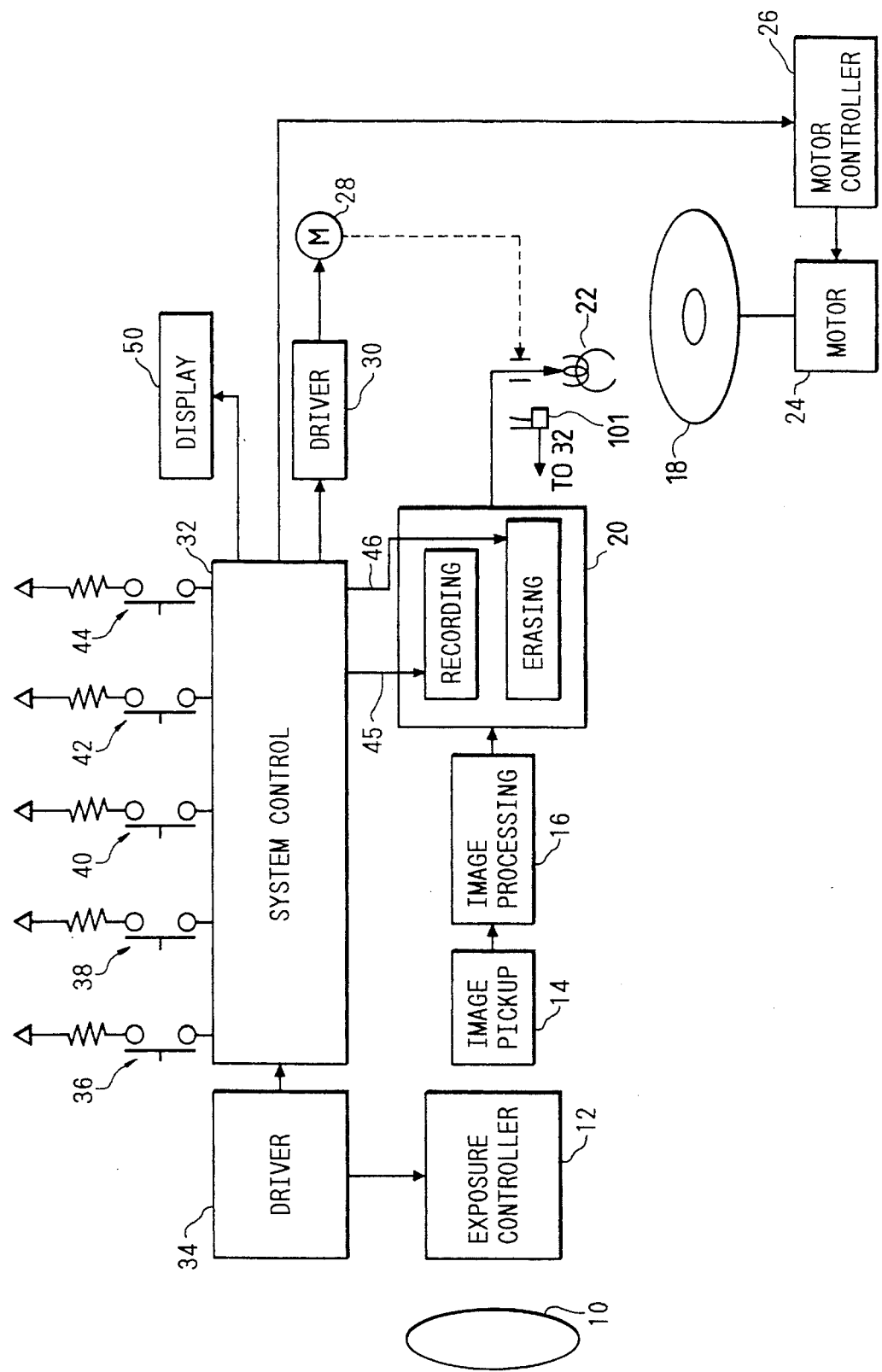
FIG. 1 is a block diagram of a construction of a data erasing device as an embodiment according to the present invention.

FIG. 1 is a conceptual block diagram of a data erasing device of an embodiment of the present invention, which is applied to a still video camera. In FIG. 1, reference numeral 10 represents an image pickup lens system, 12 an exposure control member such as a stop (an iris diaphram) and a shutter, 14 an image pickup device for converting an optical image into an electrical signal, 16 an image processing circuit for processing an image processing operation, for example, a gamma correction, blanking processing and an addition of a synchronous signal, for signals output by the image pickup device 14, 18 a magnetic disk as a recording media, 20 a recording erasing circuit including circuits for recording and erasing therein, which converts the signal output from the image processing circuit 16 to data which can be suitably recorded on the magnetic disk 18, or generates an erasing signal for erasing data recorded on the magnetic disk 18, 22 a magnetic head, 24 a drive motor for rotating the magnetic disk 18, 26 a motor control circuit for controlling the motor 24, 28 a magnetic head drive motor for moving the magnetic head 22 to a designated track (or block), 30 a drive circuit for the motor 28, 32 a system control circuit which recognizes a track which can be accessed by the magnetic head 22, by detecting a change of a switch 101 from ON to OFF and counting a number of pulses applied to the motor 28, and 34 a drive circuit for driving the exposure cotrol member 12.

Reference numeral 36 represents a standby switch which causes a rotation of the motor 24 or operates the image pickup device 14, 38 a recording trigger switch which indicates a recording mode for the magnetic disk 18, a recording/erasing switch which indicates an erasing mode when the switch 40 is ON and a recording mode when the switch 40 is OFF, 42 a up-switch which indicates a movement of the magnetic head 22 by a single track toward an innermost track, and 44 a down-switch which indicates a movement of the magnetic head 22 by a single track toward an outermost track. Reference numerals 45 and 46 represent a recording instruction and an erasing instruction, respectively. Reference numeral 101 represents the switch described above with reference to the system control circuit 32, which is changed from an OFF state to an ON state when the magnetic head 22 reaches the outermost track of the magnetic disk 18.

Figure 2B:
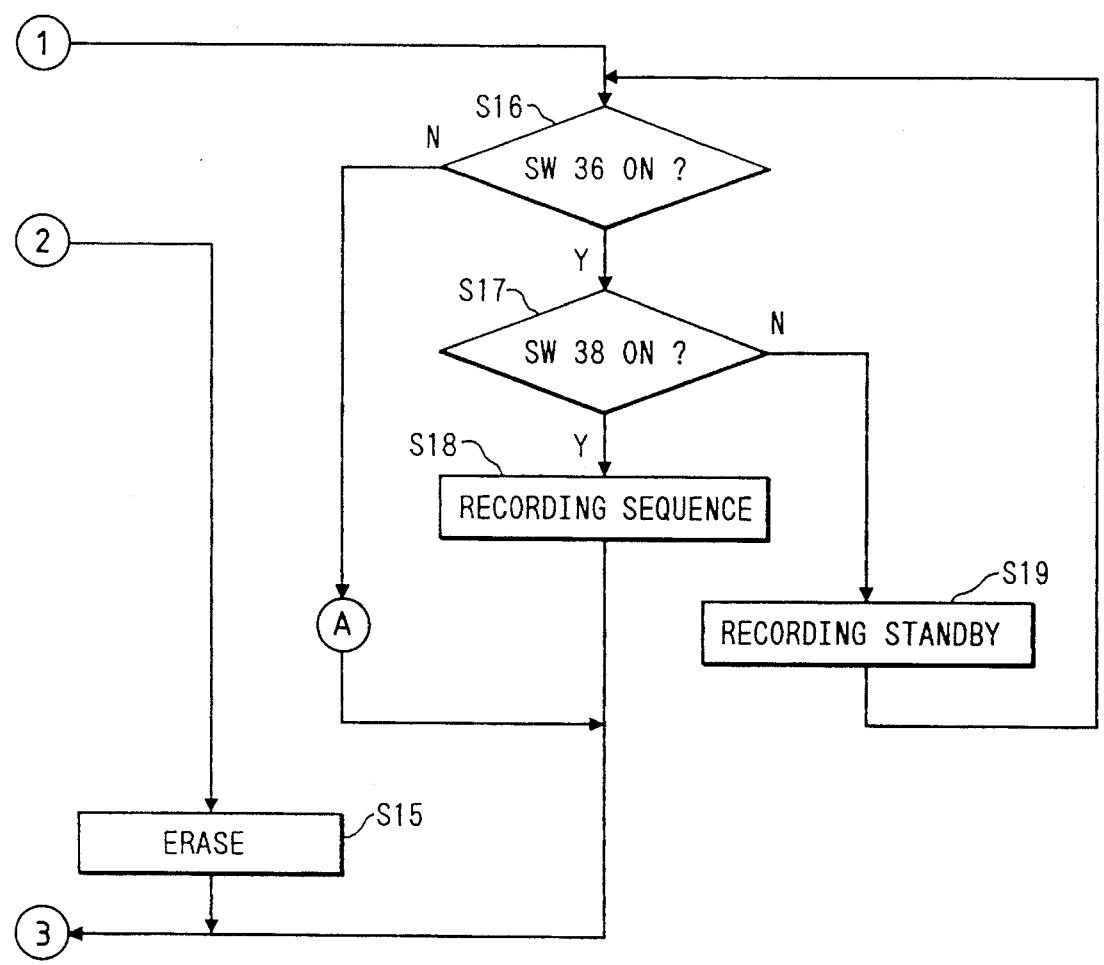
FIG. 2, consisting of FIGS. 2A and 2B, is a flowchart explaining the operation of the data erasing device shown in FIG. 1.

In this embodiment, data stored at all tracks from a track of the magnetic disk 18 which is designated as the track from which the data erasing is to be started to the innermost track, or from the designated erasing start track to the outermost track, can be erased in a lump. The erasing process toward the innermost track or the erasing process toward outermost track is designated by turning the recording/erasing switch 40 OFF and simultaneously turning the up-switch 42 ON; or simultaneously turning the down-switch 44 ON; or turning up-switch 42 ON while the recording/erasing switch 40 is kept OFF; or turning the down-switch 44 ON while the recording/erasing switch 40 is kept OFF. FIG. 2 is a flowchart explaining the erasing operation.

Before describing the erasing operation shown in FIG. 2, the operation shown in FIG. 3 will be described.

FIG. 3 shows that the magnetic head 22 is moved by one track toward the innermost track within a plurality of tracks to be erased or toward the outermost track within a plurality of tracks to be erased, by driving the up-switch 42 and the down-switch 44. More specifically, when the up-switch 42 is ON at step 30 (S30), the magnetic head 22 is moved toward the innermost track by one track (S32), unless the magnetic head 22 is already positioned at the innermost track (S31). Alternatively, when the up-switch 42 is OFF and the down-switch 44 is ON (S33), the magnetic head 22 is moved by one track toward the outermost track (S35), unless the magnetic head 22 is already positioned at the outermost track (S34). Note, if the up-switch 42 and the down-switch 44 are both OFF, when the magnetic head 22 is positioned at the innermost track (S31), or when the magnetic head 22 is positioned at the outermost track (S34), the control of the system control circuit 32 is returned to a called routine of the system control circuit 32 without moving the magnetic head 22. Also, the above selection of the magnetic head 22 in the direction of the tracks to be erased can be carried out by, for example, a ten-key device formed by ten-key switches (or push buttons) and a random access memory. The routine shown in FIG. 3 is called at steps shown in FIG. 2.

Referring again to FIG. 2, when the operation is started, first, the system control circuit 32 checks the status of the recording/erasing switch 40. When the recording/erasing switch 40 is ON, a mode is determined to be an erasing mode, and the process of the system control circuit 32 goes to step 3 (S3). On the other hand, if the recording/erasing switch 40 is OFF, the mode is determined to be a recording mode, and the process of the system control circuit 32 goes to step 16 (S16).

When the erasing mode is detected, the up-switch 42 is further checked (S3), and the operation of the system control circuit 32 for erasing data on the tracks toward the innermost track from the track at which the magnetic head 22 is now positioned, i.e., the track having the high track number can be carried out (S4 to S8). When the up-switch 42 is OFF (S3), the status of the down-switch 44 is checked (S9), and when the down-switch 44 is OFF, the operation of the system control circuit 32 for erasing the data recorded on tracks toward the outermost track from the track at which the magnetic head 22 is now positioned can be carried out (810 to 814). Those tracks are given low track numbers. When the down-switch 44 is OFF (S9), data recorded on the track at which the magnetic head 22 is now positioned is erased (S15), and the erasing process is terminated (S20).

In the operations of the system control circuit 32 for erasing data recorded on inner side tracks (S4 to S8), the system control circuit 32 outputs an erasing control signal (instruction) 45 to the recording/erasing circuit 20 to generate an erasing signal from the recording/erasing circuit 20, this erasing signal indicating an erasing of data on a single track (S4). Then, the system control circuit 32 determines whether or not the track at which the magnetic head 22 is now positioned is the innermost track (S5), and when the magnetic head 22 is positioned at the innermost track, the operation of the system control circuit 32 is terminated (S20). On the other hand, when the magnetic head 22 is not positioned at the innermost track, the system control circuit 32 moves the magnetic head 22 by one track toward the innermost track by using the routine shown in FIG. 3 (S6). Further, when either the standby switch 36 or the recording/trigger switch 38 is ON (S7, S8), the process returns to step 4 (S4) and the system control circuit 32 repeats the above erasing operation. When both the standby switch 36 and the recording/trigger switch 38 are OFF, the operation of the system control circuit 32 is terminated (S20).

The operations of the system control circuit 32 for erasing data on outer side tracks (S10 to S14) are similar to the operations described by steps S4 to S8 described above, except that the operation of the system control circuit 32 is terminated when the magnetic head 22 reaches the outermost track (S11), and the system control circuit 32 moves the magnetic head 22 by one track toward the outermost track by using the routine shown in FIG. 3, until the magnetic head 22 reaches the outermost track (S12).

In the recording mode operation (S16 to S19), when the standby switch 36 is OFF (S16), the operation of the system control circuit 32 is terminated (S20). Alternatively, when the standby switch 36 is ON, the system control circuit 32 checks the status of the recording-trigger switch 38 (S17). When the recording-trigger switch 38 is OFF, the system control circuit 32 carries out a standby process for recording, for example, controls the rotation of the magnetic disk 18, and carries out light measurement, and then continues the operation of step 16 (S16). When the recording-trigger switch 18 is ON, the system control circuit 32 carries out a recording process, for example, a process consisting of a control of the rotation of the magnetic disk 18, a light measurement and control of a quantity of exposure light, recording, movement of the magnetic head 22, etc., and then operation of the system control circuit 32 is terminated (S20).

In the embodiment described above, the direction of the tracks from which data is erased, i.e., toward either the innermost track or the outermost track for erasing data, is determined by the combination of the statuses of the up-switch 42 and the down-switch 44. However, this indication can be made by providing a switch exclusively used for this purpose, or using other switches which are already provided for other purposes. For example, an addition/subtraction switch for a clock or for setting an identification (ID) data of a user's area of a still video format, a switch for setting a photograph-taking mode, for example, setting a correction of the exposure, setting a shutter speed, setting a stop value, setting a speed for a continuouse photograph-taking operation, or a telescopic wide-angle mode switch for zooming may be employed.

Figure 4:
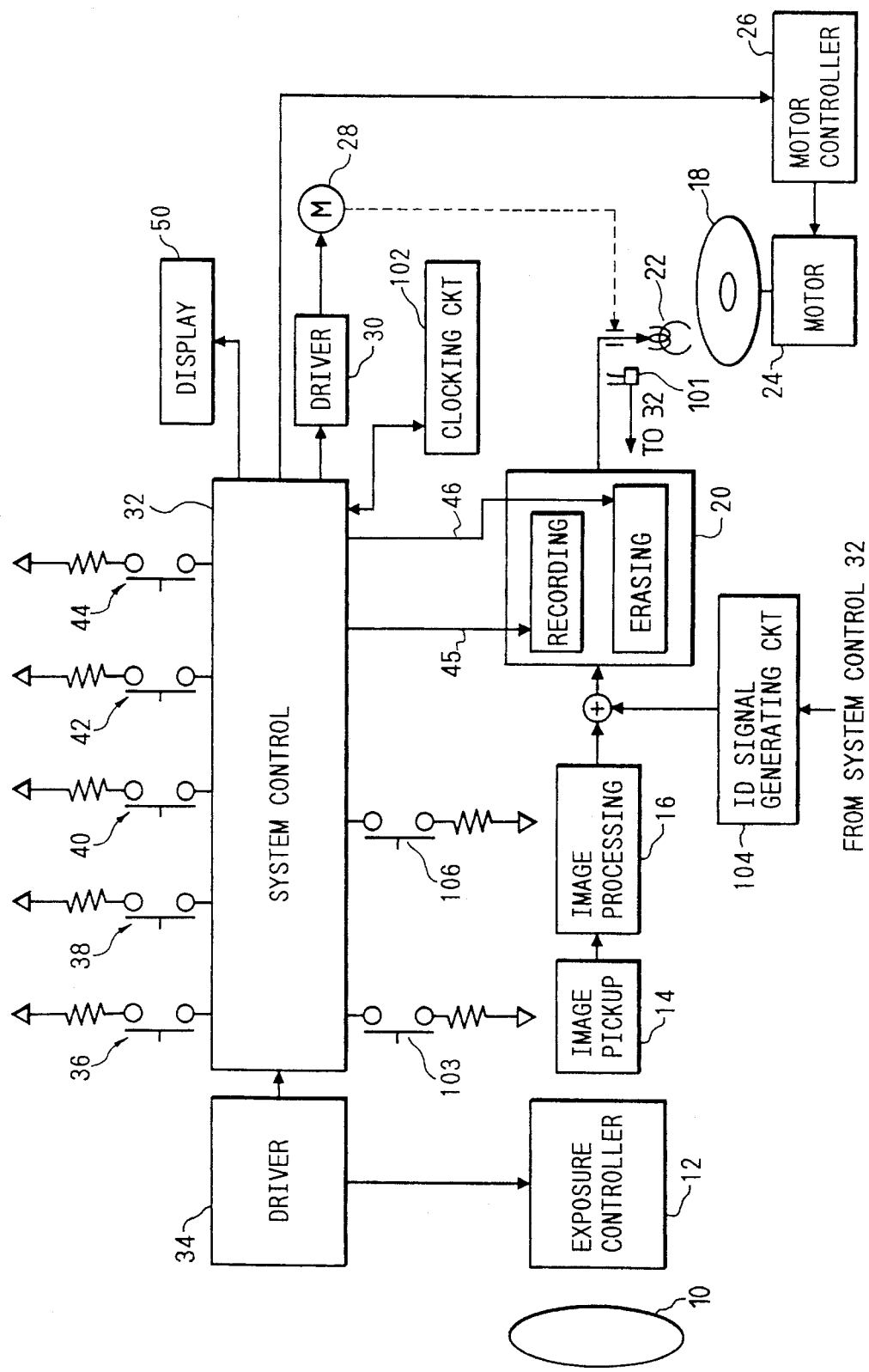
FIG. 4 is a block diagram of a construction of a data erasing device of a first modification of the embodiment according to the present invention.
Figure 5:
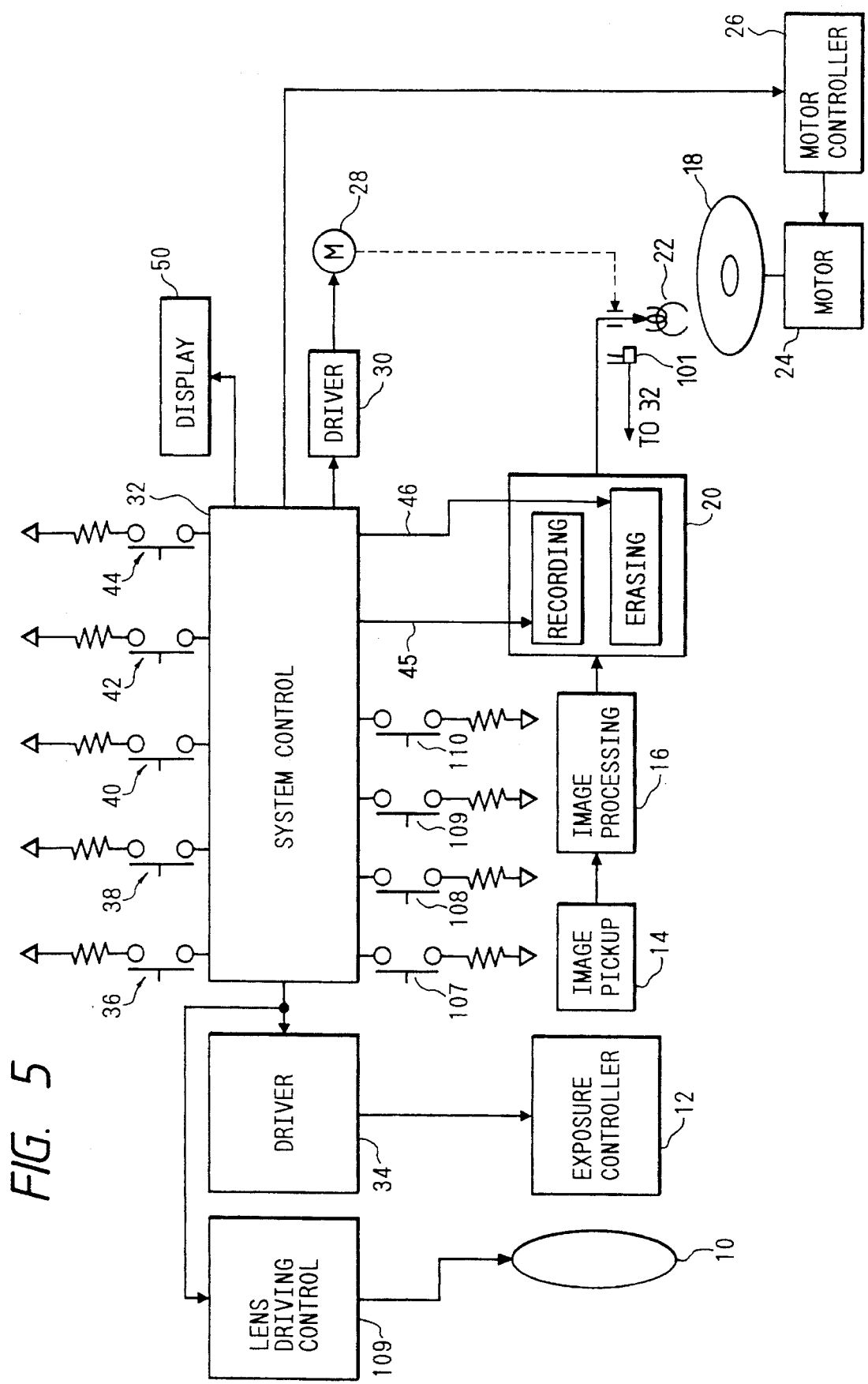
FIG. 5 is a block diagram of a construction of a data erasing device of a second modification of the embodiment according to the present invention.

FIGS. 4 and 5 are views of the constructions of the direction setting systems. In FIG. 4, reference numeral 102 denotes a clock circuit for generating time data and date data, 103 a switch for generating an indication for setting ID data, for example, track numbers except for date information, 104 an ID signal generating circuit for generating an ID signal in response to the operation of the switch 103, and 106 a switch for generating a command for setting a correction of the time data and the date data generated at the clock circuit 102.

In this construction, the up-switch 42 and the down-switch 44 indicate a change of a track access by the magnetic head 22 in a normal condition, indicate whether the data is to erased therefrom toward the innermost track or the outermost track when the data erasing instruction is output by the recording/erasing switch 40, indicates a change of data applied to the ID signal generating circuit 104 when an instruction for setting the ID data is output by the switch 103, or indicate a change of the time data or date data output by the clock circuit 102 when an instruction for correcting the time data or the date data output by the clock circuit 102 is output by the switch 106.

In FIG. 5, reference numeral 111 represents a lens drive control circuit for changing a focal length of the image pickup lens system 10, reference numerals 107 to 110 represent switches for setting an image pickup mode, i.e., the switch 107 is used for setting an exposure correction value at the exposure control circuit 12, the switch 108 is used for setting a shutter speed, the switch 109 is used for setting a stop value, and the switch 110 is used for setting a continuous photograph-taking operation speed, respectively.

In the construction described above, the up-switch 42 and the down-switch 44 are used to indicate the direction described above in the normal condition, but are used to set the image picture mode in response to the setting of each of the switches 107 to 110.

In FIGS. 4 and 5, a display 50 includes a plurality of figures, each consisting of seven segments, and is controlled to vary a display in response to the setting of the switches 103 and 106 to 110. Each display contains an additional indication representing the setting of the switches 103 and 106 to 110.

In the flowchart of FIG. 2, the erasing mode is released by turning ON the standby switch 36 or the recording-trigger switch 38 during the erasing mode. However, the release of the erasing mode can be carried out by using other switches, for example, the zoom switch shown in FIG. 5. Also, in FIG. 5, the erasing of data can be carried out by turning ON the recording/erasing switch 40, however to prevent erasing mistakes, other operations can be adopted. For example, the erasing is started when the recording/erasing switch 40 is turned ON and another switch, for example, the recording-trigger switch 38 is further turned ON, and the erasing mode is terminated when the recording-trigger switch 38 is turned OFF, and then turned ON.

In the embodiment described above, preferably, a track number from which data has been erased is displayed at the display 50. The data erasing device of the embodiment can be applied as a data erasing device which is used only for an erasure of data, or as a reproduction and erasing device, in addition to the device built-in to the recording apparatus described above.

In the above embodiment, the magnetic disk is employed as the recording media, but the present invention can be applied to a solid state memory, a magnetic tape, and other data storage media. If the present invention is applied to the solid state memory, a plurality of storage regions of the solid state memory are sequentially numbered, each storage region being given a number corresponding to a track of the magnetic disk. In this example, the storage region number is designated when data is to be erased.

According to the present invention, the recorded information to be erased is not limited to image information, and voice and other data also can be erased thereby.

According to the above embodiment of the present invention, data recorded on a recording media can be erased by a very simple operation. For example, when a requirement to hold data stored in continuous tracks but to erase all data stored in other tracks occurs, this requirement can be met by two erasing operations; i.e., the erasing data from a track next to a high number track of the continuous tracks or the erasing data from a track next to a lower number track of the continuous tracks. Also, when data is to be erased from the fifth track to the tenth track, the erasing operation can be carried out from the fifth track toward the innermost track and the erasing mode can be released after completion of the erasing data on the tenth track. Accordingly, the erasing operation is very effective and is greatly improved.

In this embodiment of the present invention, since the setting of the erasing operation can be started by using the key switches to designate a track position when erasing data from the designated track position toward the innermost track or toward the outermost track, the erasing operation is facilitated.

As seen from the above description, since the lump erasing of all data from the designated track position toward the innermost track position or toward the outermost track position can be achieved by a single operation, unwanted data recorded on the magnetic media can be erased in a short time.

Since the switches which are already provided on the data erasing device are also used to direct the erasing operation, additional switches are not necessary and the simplicity of the construction is maintained.

In the embodiment described above, the magnetic disk is described as a storage means in which data to be erased are stored, out other storage means such as a magnetic tape and a solid state memory of a semiconductor material can also be employed.

The erasing method can be adopted in response to a grade of the storage means such as a magnetic recording media, an optical recording media, a semiconductor memory, e.g., $E^2PROM$, etc.

Many widely different embodiments of the present invention may be constructed without departing from the spirit and scope of the present invention. it should be noted that the present invention is not limited to the specific embodiments described in this specification, except as defined in the appended claims.

What is claimed is:

1. An apparatus for reproducing and erasing image signals of a recording medium on which a plurality of image signals are stored in a predetermined order, comprising:

first operating means for causing the image signals to be reproduced in a first order;

second operating means for causing the image signals to be reproduced in a second order different from the first order;

third operating means for providing an instruction for erasing image signals from the recording medium; and control means for causing the image signals specified in the first order to be collectively erased in response to the operation of said first and third operating means, and for causing the image signals specified in the second order to be collectively erased in response to the operation of said second and third operating means.

2. An erasing device according to claim 1, wherein said erasing means erases the data consecutively in the blocks included in said designated group.

3. Apparatus according to claim 2, further comprising determining means for determining the image signals to be erased by said erasing means.

4. Apparatus according to claim 1, wherein said recording medium comprises a disc.

5. An erasing device according to claim 4, wherein said recording media comprises a disk shaped recording media.

6. Apparatus according to claim 1, wherein said first and second operating means each comprises a separate operation member.

7. Apparatus according to claim 1, further comprising reproducing means for reproducing the image signals recorded on the recording medium.

8. Apparatus according to claim 7, wherein said control means also controls the reproduction order of the image signals recorded on the recording medium.

9. An apparatus for reproducing and erasing information signals of a recording medium on which a plurality of information signals are stored in a predetermined order, comprising:

first operating means for causing the information signals to be reproduced in a first order;

second operating means for causing the information signals to be reproduced in a second order different from the first order;

third operating means for providing an instruction for erasing information signals from the recording medium;

display means for displaying at least one information signal which is being erased; and control means for causing (i) the information signal specified in the first order to be sequentially erased in response to operation of said first and third operating means and (ii) said display means to display at least one information signal which is being erased, and for causing (i) the information signal specified in the second order to be sequentially erased in response to operation of said second and third operating means and (ii) said display means to display at least one information signal which is being erased.

10. Apparatus according to claim 9, wherein said recording medium has a memory capacity capable of recording one screen of image signals.

11. Apparatus according to claim 9, wherein said recording medium comprises a disc.

12. Apparatus according to claim 11, wherein said recording medium includes a plurality of tracks concentrically arranged on the disc.

13. Apparatus according to claim 9, further comprising erasing means for erasing the information signals.

14. Apparatus according to claim 13, wherein said display means displays the stopping of the operation of the erasing means while the sequential erasing operations are being carried out.

15. Apparatus according to claim 9, further comprising reproducing means for reproducing the information signals recorded on the recording medium.

16. Apparatus according to claim 15, wherein said display means designates the information signals to be reproduced by said reproducing means.

* * * * *

UNITED STATES PATENT AND TRADEMARK OFFICE
CERTIFICATE OF CORRECTION

PATENT NO. : 5,570,245  
DATED : October 29, 1996  
INVENTOR(S) : NOBUO FUKUSHIMA Page 1 of 4

It is certified that error appears in the above-indentified patent and that said Letters Patent is hereby corrected as shown below:

COLUMN 1

```
Line 15, "media." should read --medium.--
Line 19, "media." should read --medium.--.
Line 34, "50-th" should read --50th--.
Line 59, "media" should read --medium--.
Line 64, "media" should read --medium--.
Line 52 "media" should read --medium--
```

COLUMN 2

```
Line 1, "media" should read --medium--.
Line 3, "including;" should read --including:--.
Line 9, "media" should read --medium--.
Line 13, "media" should read --medium--.
Line 28, "the,accompany-" should read
--the accompany- --.
Line 63, "media" should read --medium--.
Line 6, "media" should read --medium--.
```

UNITED STATES PATENT AND TRADEMARK OFFICE
CERTIFICATE OF CORRECTION

PATENT NO. : 5,570,245

DATED : October 29, 1996

INVENTOR(S) : NOBUO FUKUSHIMA

It is certified that error appears in the above-indentified patent and that said Letters Patent is hereby corrected as shown below:

COLUMN 3

Line 62, "ten-key" (second occurrence) should read --ten key--.

COLUMN 4

Line 17, "(810" should read --(S10--.
Line 18, "814)." should read --S14).--.
Line 39, "repeates" should read --repeats--.
Line 45, delete "described" (second occurrence).

COLUMN 5

Line 33, "indicates" should read --indicate--.

COLUMN 6

Line 15, "media" should read --medium--.
Line 27, "media" should read --medium--.
Line 31, "erasing data" should read --erasing of data--.
Line 33, "erasing data" should read --erasing of data--.
Line 48, "toward" should read --toward the--.
Line 50, "media" should read --medium--.
Line 63, "media" should read --medium--.
Line 64, "media" should read --medium--.

UNITED STATES PATENT AND TRADEMARK OFFICE
CERTIFICATE OF CORRECTION

PATENT NO. : 5,570,245

DATED : October 29, 1996

INVENTOR(S) : NOBUO FUKUSHIMA

It is certified that error appears in the above-indentified patent and that said Letters Patent is hereby corrected as shown below:

COLUMN 7

Line 1, "it" should read --It--.

Lines 23 to 25, Delete lines 23, 24 and 25;
insert --2. Apparatus according to claim 1, further comprising erasing means for consecutively erasing the image signals from the recording medium.--

Lines 31 and 32, Delete lines 31 and 32;
insert --5. Apparatus, according to Claim 4, wherein said recording medium includes a plurality of tracks concentrically arranged on the disk.--

SHEET 2

Fig. 2A, "MOSTINNER" should read --INNERMOST.--
Fig. 2A, "MOSTOUTER" should read --OUTERMOST.--

UNITED STATES PATENT AND TRADEMARK OFFICE
CERTIFICATE OF CORRECTION

PATENT NO. : 5,570,245

DATED : October 29, 1996

INVENTOR(S) : NOBUO FUKUSHIMA

Page 4 of 4

It is certified that error appears in the above-indentified patent and that said Letters Patent is hereby corrected as shown below:

SHEET 4

Fig. 3, "MOSTINNER" should read --INNERMOST--.
Fig. 3, "MOSTOUTER" should read --OUTERMOST--

Signed and Sealed this

Tenth Day of June, 1997

Attest:

BRUCE LEHMAN

Attesting Officer

Commissioner of Patents and Trademarks